United States Patent [19]

Yamamoto

[11] Patent Number: 4,618,042
[45] Date of Patent: Oct. 21, 1986

[54] CONTROL FOR AUTOMATIC TRANSMISSIONS

[75] Inventor: Koichi Yamamoto, Hiroshima, Japan

[73] Assignee: Mazda Motor Corporation, Hiroshima, Japan

[21] Appl. No.: 635,930

[22] Filed: Jul. 30, 1984

[30] Foreign Application Priority Data

Jul. 30, 1983 [JP] Japan .......................... 58-119544[U]

[51] Int. Cl.⁴ .................... B60K 41/28; F16D 25/061
[52] U.S. Cl. ............... 192/0.044; 192/0.09; 192/0.094; 192/0.076; 192/3.58
[58] Field of Search ........... 192/0.094, 0.082, 0.055, 192/0.044, 0.042, 0.076, 3.57, 3.58, 0.09

[56] References Cited

U.S. PATENT DOCUMENTS

| | | | |
|---|---|---|---|
| 3,309,934 | 3/1967 | Gustafsson | 74/339 |
| 4,105,101 | 8/1978 | Förster et al. | 192/4 A |
| 4,363,389 | 12/1982 | Zaunberger et al. | 192/0.042 |
| 4,509,625 | 4/1985 | Tellert | 192/0.033 |
| 4,509,628 | 4/1985 | Junginger et al. | 192/0.094 |
| 4,514,811 | 4/1985 | Daubenmier et al. | 364/424.1 |

FOREIGN PATENT DOCUMENTS 58-21047 2/1983 Japan .

OTHER PUBLICATIONS

A Copy of the Corrected FIG. 1 from Application File of Zaunberger et al., (Ser. No. 177,565), published 12-14-82.

Primary Examiner—Rodney H. Bonck
Assistant Examiner—David A. Testardi
Attorney, Agent, or Firm—Fleit, Jacobson, Cohn & Price

[57] ABSTRACT

A vehicle having an automatic transmission including a hydraulic torque converter and a gear mechanism driven by the torque converter. The gear mechanism includes a hydraulically operated clutch for establishing a forward driving gear train. A control circuit is provided for disengaging the clutch when the engine speed is idling and the vehicle brake is actuated with the select valve of the transmission is in a running range and the engine throttle valve in a closed position so that the forward driving gear train is disconnected.

18 Claims, 6 Drawing Figures

4,618,042

CONTROL FOR AUTOMATIC TRANSMISSIONS

BACKGROUND OF THE INVENTION

1. Field of the Invention

The present invention relates to control means for automatic transmissions and more particularly to control means for automatic transmissions adapted to be used in motor vehicles such as automobiles.

2. Description of Prior Art

Conventional automatic transmissions generally include a hydraulic torque converter having an output shaft connected with a multiple-stage gear transmission mechanism such as a planetary gear mechanism. For selecting a desired one of the gear stages, the transmission usually includes a hydraulic system which are hydraulically operated or electromagnetically operated valves for appropriately selecting hydraulic circuits to thereby engage selected ones of friction devices such as clutches and brakes. The hydraulic system usually includes a manually operated shift valve which has a running range including D-range, 2-range, 1-range and R-range and a non-running range including N-range and P-range. Among the friction devices for selecting the gear stages of the gear transmission mechanism, there are a forward clutch which is adapted to be engaged in the D, 2 or 1-range and a reverse clutch which is adapted to be engaged in the R-range. Either one of these clutches is held in engagement even when the vehicle is not running as long as the shift valve is in the running range so that engine vibrations are transmitted through the transmission to the vehicle body. Such vibrations are particularly felt in idling operations of the engine.

In Japanese patent application No. 56-117742 filed on July 29, 1981 and disclosed for public inspection on Feb. 7, 1983 under the disclosure No. 58-21047, there is disclosed a transmission control in the pressure to the clutch is decreased, when the engine is in idling operation, below a level wherein the clutch can be engaged. With this proposal, it is possible to prevent the engine vibrations as produced in the idling operation from being transmitted to the vehicle body. However, the proposed control is primarily aimed to prevent a so-called creep phenomenon wherein the vehicle is slowly moved even under the idling operation of the engine by having the engine driving torque transmitted through the torque converter and the gear mechanism to the vehicle driving shaft. Therefore, with the control as proposed by this Japanese application, there is no means for transmitting the driving torque as long as the engine is in the idling operation. It should however be noted that there are some occasions wherein the creep phenomenon can be advantageously utilized. For example, in parking the vehicle in a very limited space or in driving in a traffic jam, it is very often necessary to move the vehicle at a very slow speed and the creep can advantageously be utilized for that purpose.

OBJECT OF THE INVENTION

It is therefore an object of the present invention to provide a control system for an automatic transmission in which engine vibrations in idling operation can be prevented from being transmitted to the vehicle body but the creep phenomenon can advantageously be utilized for moving the vehicle at a very slow speed.

Another object of the present invention is to provide a control system for an automatic transmission which can avoid delay of clutch connection and clutch connecting shock when it is desired to start the vehicle to run.

A further object of the present invention is to provide a control system for an automatic transmission in which means is provided for making it possible to feel that the manual shift lever is moved from a nonrunning range to a running range.

SUMMARY OF THE INVENTION

According to the present invention, the above and other objects can be accomplished by a control system for vehicle automatic transmissions comprising hydraulic actuator means for engaging friction engaging means for establishing a driving gear train, hydraulic conduit means for supplying hydraulic pressure to said hydraulic actuator means, control valve means provided in said hydraulic conduit means to connect the actuator means alternately to hydraulic source means and drain conduit means, pressure reducing valve means provided in said drain conduit means for producing a pressure which is lower than a pressure for making the friction engaging means engage, vehicle speed detecting means for detecting vehicle speed and producing a low vehicle speed signal showing that the vehicle speed is below a predetermined value, position detecting means for detecting position of an engine power control member and producing a position signal when the control member is in a low engine output side than a predetermined position, brake actuation detecting means for producing a brake signal when vehicle brake means is in operation, range detecting means for detecting position of a manually operated shift lever and producing a running range signal when said shift lever is in a running range, valve actuating means for actuating said control valve means, control means for controlling operation of said valve actuating means, said control means being responsive to said low vehicle speed signal, said position signal, said brake signal, and said running range signal for producing a control signal to operate said valve actuating means for moving said control valve means so that the hydraulic actuator means is connected to the drain conduit means when all of said signals are received.

With this arrangement, when the shift lever is in one of the running ranges, such as D-range, 2-range, 1-range and R-range, but the vehicle brake is applied and the engine speed is below the predetermined value, for example, in idling speed, the friction engaging means is disengaged so that the engine vibrations are prevented from being transmitted to the vehicle body. When the vehicle brake is released, however, the two-way valve means is moved to connect the hydraulic pressure source to the hydraulic actuator means to make the friction engaging means engage so that a creep phenomenon is produced.

When the shift lever is in a non-running range, such as the P-range or N-range, the friction engaging means is disengaged and, if the shift lever is moved from this position to a running range with the vehicle brake applied and the engine in the idling operation, the friction engaging means will remain disengaged. This may cause an inconvenience because the operator cannot confirm that the shifting to the running range is actually carried out. In order to avoid the problem, the control means may be provided with means for delaying the transmittal of the running range signal for a certain time interval so that, when the shift lever is moved from the non-running range to the running range, the friction engaging means is momentarily engaged and thereafter disengaged producing an engaging shock which will be felt by the operator making it possible to confirm that the shifting is unfailingly carried out.

DESCRIPTIONS OF PREFERRED EMBODIMENTS

Mechanism of the Transmission

Figure 1:
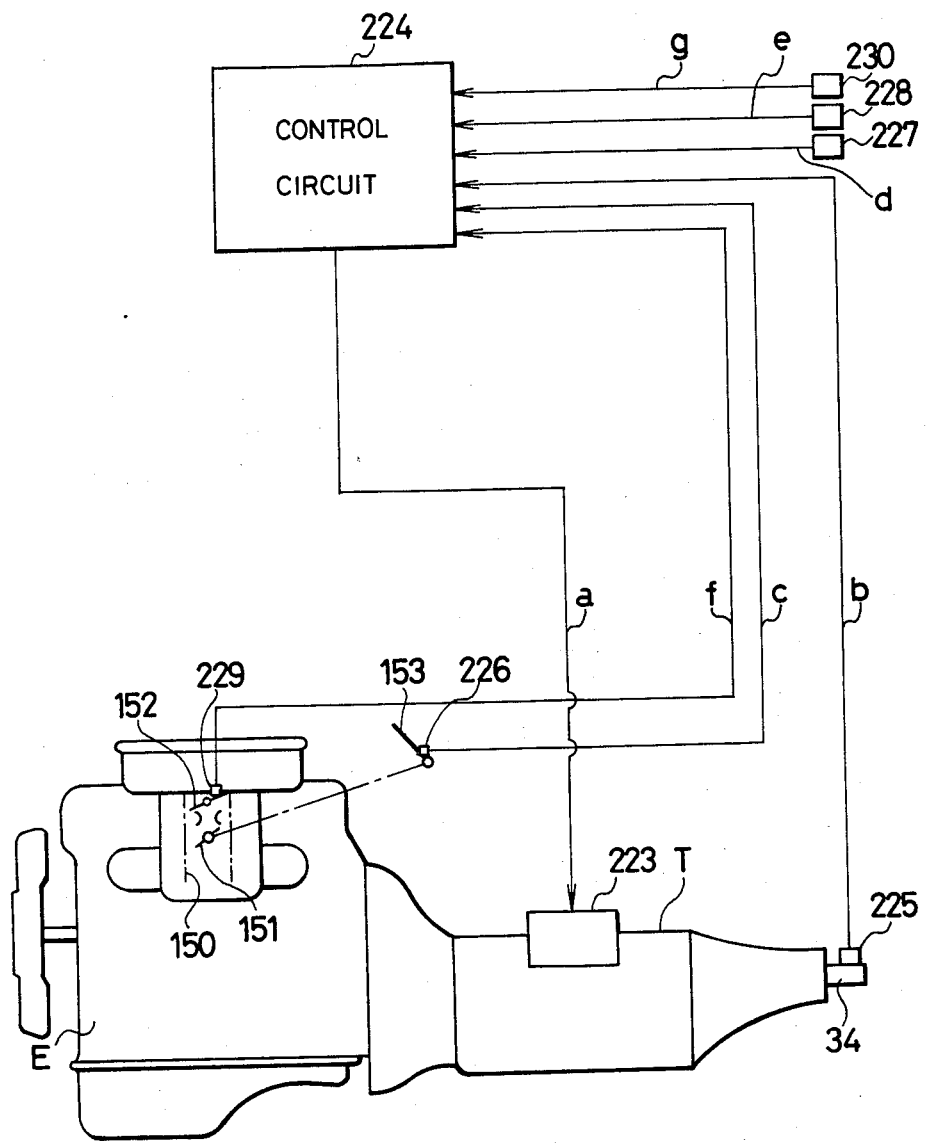
FIG. 1 is a diagrammatical illustration of an automatic transmission to which the present invention can be applied.

Referring to the drawings, particularly to FIG. 1, there is shown an automatic transmission T which comprises a hydraulic torque converter 10, a multiple stage transmission gear mechanism 20, and a planetary gear type overdrive transmission mechanism 50 arranged between the torque converter 10 and the multiple stage transmission gear mechanism 20.

The torque converter 10 has a pump 11 connected with an engine output shaft 1 through a converter casing 10a, a turbine 12 facing to the pump 11 and a stator 13 disposed between the pump 11 and the turbine 12. A converter output shaft 14 is connected with the turbine 12. A lock-up clutch 15 is provided between the converter output shaft 14 and the casing 10a which is connected to the pump 11. The lock-up clutch 15 is normally engaged with the casing 10a under a pressure of hydraulic fluid which circulates in the torque converter 10, and is released by a hydraulic pressure, which is drawn to a space between the casing 10a and the clutch 15 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 through a connecting rod 25. The gear mechanism 20 has an input shaft 26 connected through a front clutch 27 with the connecting rod 25 and through a rear clutch 28 with an internal gear 29 of the front planetary gear unit 21. A front brake 30 is provided between the connecting rod 25 or the sun gears 23, 24 and a casing of the transmission. The gear mechanism 20 also has an output shaft 34 connected with a planetary carrier 31 of the front planetary gear unit 21 and an internal gear 33 of the rear planetary gear unit 22. The rear planetary gear unit 22 has a planetary carrier 35, and there are provided between the planetary carrier 35 and the transmission casing a rear brake 36 and a one-way clutch 37.

The planetary gear type over-drive transmission mechanism 50 includes planetary gears 51, a planetary carrier 52 rotatably carrying the planetary gears 51 and connected with the output shaft 14 of the torque converter 10, a sun gear 53 engaged with the planetary gears 51, and internal gear 55 which is also engaged with the planetary gears 51 and connected with the sun gear 53 through a direct connecting clutch 54. An overdrive brake 56 is provided between the sun gear 53 and the transmission casing. The internal gear 55 is connected with the input shaft 26 of the multiple stage transmission gear mechanism 20.

The multiple stage transmission gear mechanism 20 is of known type and can provide three forward driving gear stages and one reverse stage. The planetary gear type overdrive transmission mechanism 50 connects the shafts 14 and 26 directly when the direct connection clutch 54 is engaged and the brake 56 is released, and provides an over-drive connection between the shafts 14 and 26 when the brake 56 is engaged and the clutch 54 is released.

Hydraulic Control Circuit

Figure 2:
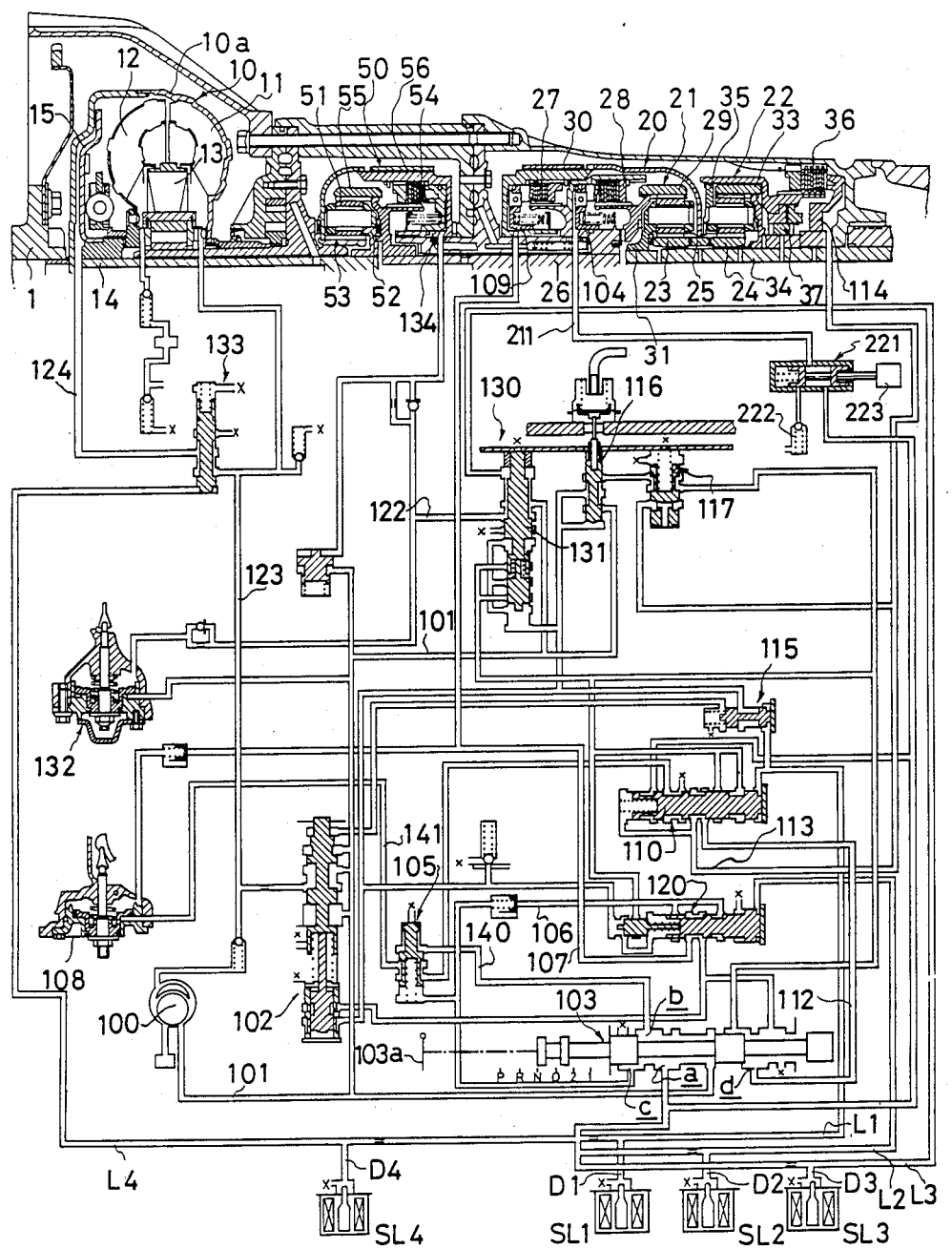
FIG. 2 is a view showing the details of the transmission mechanism.

The above-mentioned automatic transmission is provided with a hydraulic control circuit as shown in FIG. 2. The hydraulic control circuit has an oil pump 100 which is driven by the engine output shaft 1. Hydraulic oil is discharged under pressure from the pump 100 into a pressure line 101. The oil pressure is reduced by a pressure regulating valve 102 and applied to a select valve 103. The select valve 103 has a plunger which can be selectively positioned by means of a shift lever 103a in one of the shift positions 1, 2, D, N, R and P. When the plunger is positioned in one of the shift position 1, 2 and D which may be referred as running ranges, the pressure line 101 is communicated with ports a, b, c of the select valve 103. The port a is communicated with a hydraulic actuator 104 for the rear clutch 28. When the select valve 103 is positioned in the above mentioned position, the actuator 104 makes the rear clutch 28 engage. The port a is also communicated with the left-hand end portion of a 1-2 shift valve 110 having a spool which is now biased rightward in FIG. 1 under the oil pressure from the port a. The port a is further communicated with the right-hand end portion of the 1-2 shift valve 110 through a first line L1, the right-hand end portion of a 2-3 shift valve 120 through a second line L2, and the upper end portion of a 3-4 shift valve 130 through a third line L3. Second and third drain lines D1, D2 and D3 are provided in the first, second and third lines L1, L2 and L3, respectively. These drain lines D1, D2 and D3 are respectively provided with a first, second and third solenoid valves SL1, SL2 and SL3 for opening and closing them. When the port a is communicated with the line 101, the solenoid valves SL1, SL2 and SL3 are energized to close the drain lines D1, D2, D3, and as a result, the pressure is built up in the first, second and third line L1, L2, L3.

The port b is communicated with a second lock valve 105 through a line 140. The oil pressure which is applied from the port b to the second lock valve 105 acts to bias the spool of the valve 105 downwards. When the spool of the valve 105 is in the lower position, the line 140 is communicated with the line 141 so that the oil pressure is introduced into a brake engaging pressure chamber of the actuator 108 to engage the front brake 30. The port c is communicated with the second lock valve 105. The oil pressure which is applied from the port c to the second lock valve 105 acts to bias the spool of the valve 105 upward. The port c is also communicated with line 2-3 shift valve 120 through a pressure line 106. The line 106 is communicated with a line 107 when the spool of the 2-3 shift valve 120 is moved leftward by the pressure in the second line L2 which increases upon energizing the solenoid valve SL2 in the drain line D2. The line 107 is communicated with the releasing pressure chamber of the actuator 108. When oil pressure is introduced into such releasing pressure chamber, the actuator 108 is moved to release the brake 30 against the pressure in the engaging pressure chamber. Besides, the pressure in the line 107 is introduced into the actuator 109 for the front clutch 27 to make the clutch 27 engage.

The select valve 103 has a port d which is communicated with the pressure line 101 when the valve 103 is positioned in the position 1. The port d is communicated with the 1-2 shift valve 110 through a line 112, and with an actuator 114 for the rear brake 36 further through a line 113. When the solenoid valves SL1 and SL2 are energized, the spools of the 1-2 shift valve 110 and the 2-3 shift valve 120 are moved to thereby change the port connections for engaging appropriate brakes and/or clutches to establish 1-2, 2-3 shifting operations respectively. The hydraulic control circuit is also provided with a cut-back valve 115 for making the oil pressure from the pressure regulating valve 102 stable, a vacuum throttle valve 116 for varying the line pressure from the pressure regulating valve 102 according to the suction pressure in the engine intake passage, and a valve 117 for backing up the throttle valve 116.

When the select valve 103 is positioned in the shift position R which may also be referred as one of the running ranges, a reverse driving gear train is established. When the select valve 103 is either of the shift positions P and N which may be referred as nonrunning ranges, no driving gear trains are provided.

In the above arrangement, the relations of the respective transmission stages and the lock-up with respect to the operations of the solenoids, the clutches and the brakes are shown in the Tables 1 through 3.

TABLE 1

| Shift position | Solenoid valve | | |
|---|---|---|---|
| | 1 | 2 | 3 |
| 1 | OFF | OFF | OFF |
| 2 | ON | OFF | OFF |
| 3 | ON | ON | OFF |
| 4 | ON | ON | ON |

TABLE 2

| SOL 4 | Lock-up |
|---|---|
| ON | engage |
| OFF | release |

TABLE 3

| | clutch 28 | clutch 27 | clutch 15 | clutch 54 | brake 36 | brake 30 | brake 56 | one-way clutch 37 | gear ratio |
|---|---|---|---|---|---|---|---|---|---|
| P | | | | o | | | | | |
| R | | o | | o | o | | | | 2.181 |
| N | | | | o | | | | | |
| D | | | | | | | | | |
| first | o | | | o | | | | o | 2.458 |
| second | o | | (o) | o | | o | | | 1.458 |
| third | o | o | (o) | o | | | | | 1.000 |
| OD | o | o | (o) | | | | o | | 0.685 |
| 2 | o | | | o | | o | | | 1.458 |
| 1 | | | | | | | | | |
| first | o | | | o | o | | | | 2.458 |
| second | o | | | o | | o | | | 1.458 |

Furthermore, this hydraulic control circuit is provided with a 3-4 shift valve 130 and an actuator 132a for controlling the clutch 54 and the brake 56 of the planetary gear type over-drive transmission mechanism 50. The actuator 132 has an engaging pressure chamber communicated with the pressure line 101. The brake 56 is operated when the actuator 132 is moved under the pressure in the line 101. When the solenoid valve SL3 is energized, the spool of the 3-4 shift valve 130 is moved downward to communicate the pressure line 101 with a line 122 so that the oil pressure is introduced into the line 122. The oil pressure introduced into the line 122 acts on a releasing pressure chamber of the actuators 132 to release the brake 56, and on an actuator 134 to make the clutch 54 engage.

Still furthermore, the present hydraulic control circuit is provided with a lock-up control valve 133, which is communicated with a port a of the select valve 103 through a line L4. From the line L4, divided is a drain line D4 which is provided with a solenoid valve SL4. When the pressure in the line L4 increases by closing the drain line D4 with the solenoid valve SL4 being energized, the lock-up control valve 133 has its spood moved to cut the communication between the lines 123 and 124 and drain the pressure in the line 124 so that the lock-up clutch 15 is engaged.

As will be noted in Table 3, the front clutch 27 functions to establish a reverse driving gear train so that it may be referred as a reverse driving clutch. The rear clutch 28 functions to establish a forward driving gear train so that it may be referred as a forward driving clutch.

Control System

Referring now to FIG. 1, it will be noted that the transmission T is connected with an engine E having an intake passage 150 provided with a throttle valve 151 and a choke valve 152 of known arrangements. The throttle valve 151 is interconnected with a foot pedal 153 so that it is actuated by the foot pedal 153. For controlling the transmission, there is provided a control circuit 224. On the output shaft 34, there is a vehicle speed switch 225 which closes when the vehicle speed is below a predetermined value to produce a low vehicle speed signal b. The foot pedal 153 is provided with a pedal switch 226 which closes when the opening of the throttle valve 151 is smaller than a predetermined value to produce a throttle valve position signal c. There are also provided a vehicle foot brake switch 227 and a hand brake switch 228 which are respectively closed when the respective brakes are applied to produce brake signals d and e. The choke valve 152 is provided with a choke valve switch 229 which closes when the choke valve 152 is not actuated to produce a choke signal f. Further, the select valve 103 is provided with an inhibitor switch 230 which opens when the select valve 103 is in one of the running ranges, namely, 1, 2, D and R shift positions. The control circuit 224 receives the aforementioned signals and produce a control signal a which is applied to a valve actuator 223 in the hydraulic control circuit.

Driving Clutch Control

Figure 3:
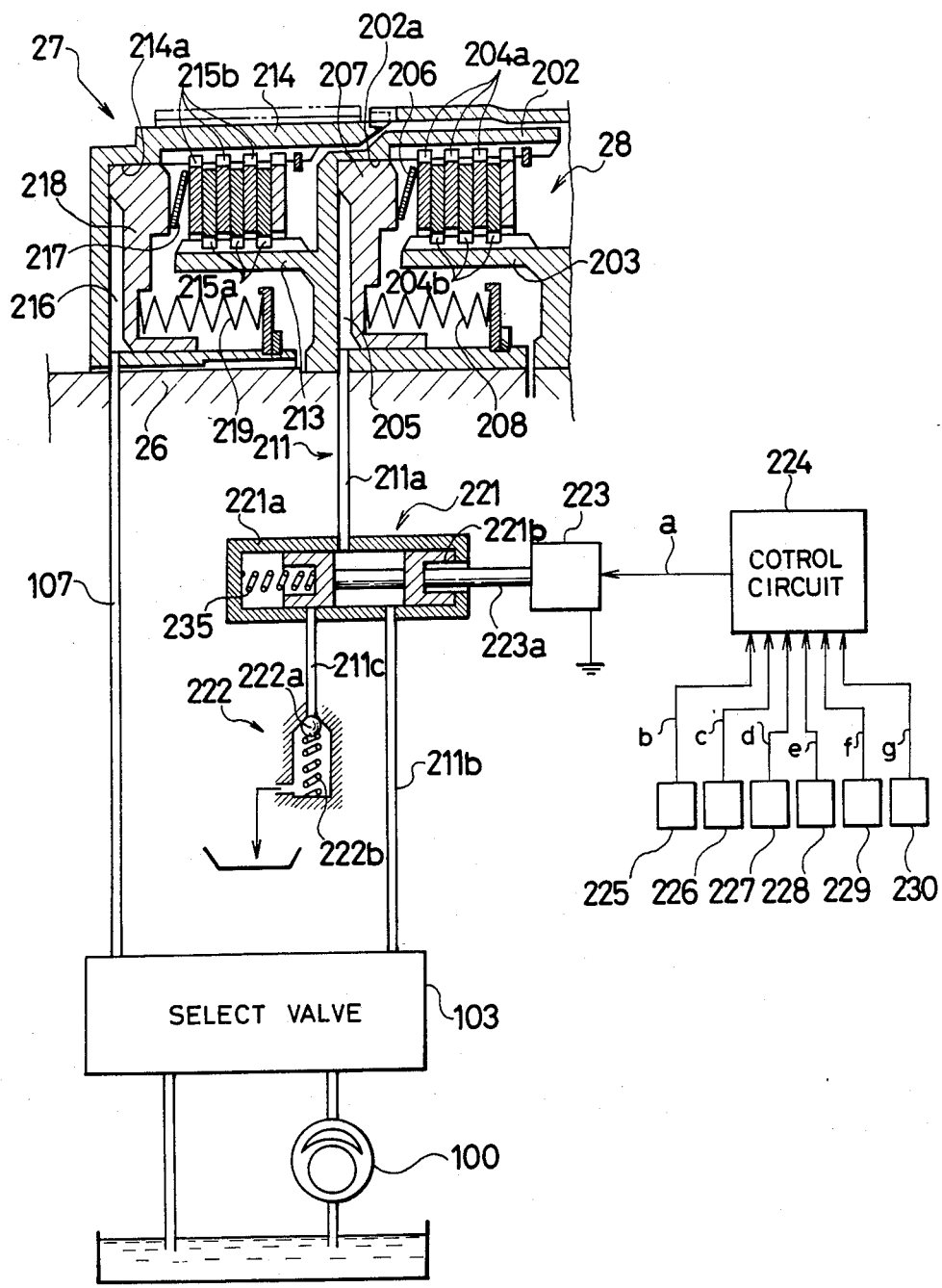
FIG. 3 is a fragmentary illustration of the control system in accordance with one embodiment of the present invention.

Referring to FIG. 3, it will be noted that the forward driving clutch or rear clutch 28 includes an input drum member 202 connected with the input shaft 26 and an output member 203 connected with the internal gear 29 of the front planetary gear unit 21. The drum member 202 carries a plurality of clutch discs 204a which are axially slidable with respect to the drum member 202 but rotatable together with the drum member 202. The output member 203 carries a plurality of clutch discs 204b which are alternately arranged with the clutch discs 204a on the drum member 202. The clutch discs 204b are axially slidable with respect to the output member 203 but rotates together with the output memory 203. In the drum member 202, there is formed a cylinder 202a and a piston 207 is axially slidably disposed in the cylinder 202a to define a pressure chamber 205. A disc spring 206 is disposed between the piston 207 and the adjacent one of the clutch discs 204a. A return spring 208 is provided for forcing the piston 207 in clutch release direction.

The reverse driving clutch or front clutch 27 includes a cylindrical hub 213 which is integral with the drum member 202 of the rear clutch 28 and an output drum member 214 rotatably supported on the input shaft 26. The output drum member 214 is connected through a bell-shaped connecting member with the sun gears 23 and 24 of the front and rear planetary gear units 21 and 22. The cylindrical hub 213 carries a plurality of clutch discs 215a which are axially slidable with respect to the hub 213 but rotatable with the hub 213. The drum member 214 carries a plurality of clutch discs 215b which are axially slidable with respect to the drum member 214 but rotate together with the drum member 214. The clutch discs 215b are arranged alternately with the clutch discs 215a. In the drum member 214, there is formed a cylinder 214a and a piston 218 is disposed in the cylinder 214a for an axial slidable movement to define a pressure chamber 216. A disc shaped spring 217 is disposed between the piston 218 and the adjacent one of the clutch discs 215b. A return spring 219 is provided to force the piston 218 in clutch release direction.

The pressure chamber 205 of the rear clutch 28 is connected through a hydraulic line 211 with the select valve 103 whereas the pressure chamber 216 is connected with the line 107 which is connected through the select valve 103 with the pump 100 when the select valve 103 is in the R-position. In the line 211, there is provided a clutch control two-way valve 221 which includes a casing 221b and a valve member 221a disposed in the casing 221a. The casing 221a has a pressure port which is connected with a line segment 211b leading to the select valve 103 to be supplied with hydraulic pressure when the select valve 103 is one of the D, 2 and 1 positions. The casing 221a further has an outlet port which is connected with a line segment 211a leading to the pressure chamber 205. There is also provided in the casing 221a a drain port connected with a drain line 211c. The valve member 221b functions to connect the outlet port with the pressure port when it is in a rightwardly shifted position but with the drain port in a leftwardly shifted position. A return spring 235 forces the valve member 221b rightward. The valve member 221b is connected with the valve actuator 223 through an actuating rod 223a. The control circuit 224 applies its output a to the actuator 223 to force the valve member 221b toward left.

In the drain line 211c, there is provided a pressure reducing valve 222 which includes a ball 222a forced by a spring 222b to a closed position. The valve 222 functions to maintain in the drain line 211c a pressure which is not sufficient to overcome the force applied to the piston 207 by the spring 208.

Control Circuit

Figure 4:
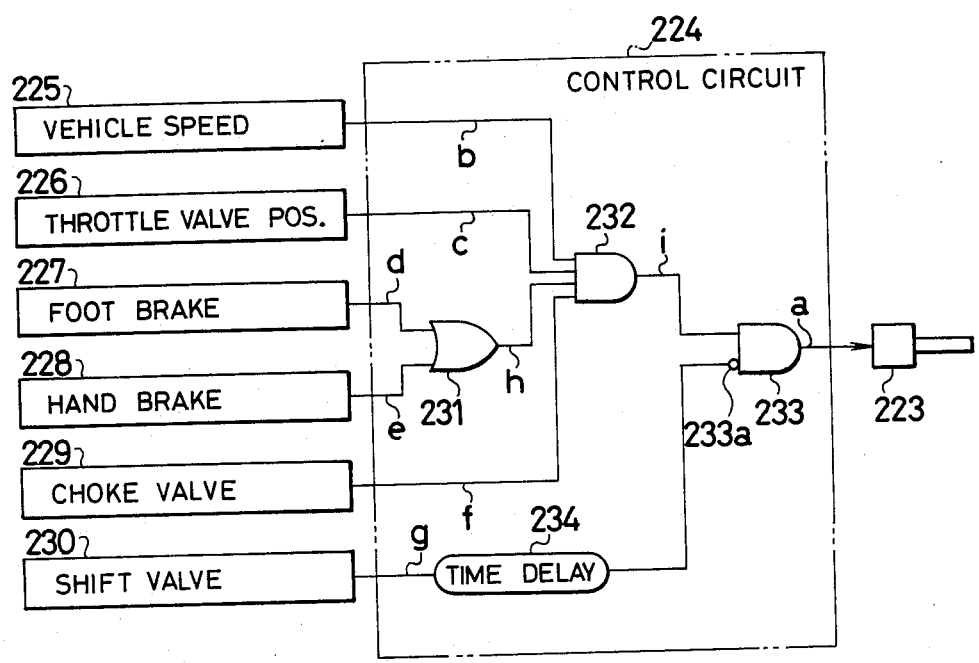
FIG. 4 is a schematic illustration of the control circuit.

Referring to FIG. 4, the control circuit 224 includes an OR circuit 231 which have input terminals connected respectively with the foot brake switch 227 and the hand brake switch 228 to receive the signals d and e. The OR circuit 231 produces a high level signal h when either or both of the signals d and e are received. There is a first AND circuit 232 which has input terminals connected respectively with the switches 225, 226 and 227 and the output of the OR circuit 231 to receive the signals b, c, f and h. The AND circuit 232 produces a high level signal i when all of the signals b, c, f and h are received. The output of the first AND circuit 232 is connected with an input terminal of a second AND circuit 233 which has a second input terminal connected through a time delay circuit 234 with the inhibitor switch 230. Since the output of the time delay circuit 234 is connected with the AND circuit 233 through an inverter 233a, the AND circuit 233 receives a high level signal when the switch 230 is opened, that is, when the select valve 103 is in one of the running ranges. The second AND circuit 233 produces a high level output a when high level signals are received.

Operations

In the arrangements described above, when the vehicle is stopped with the select valve in one of the D, 2 and 1 positions and one or both of the foot brake and the hand brake applied, a high level signal a is produced at the second AND circuit 233 provided that the engine throttle valve 151 is substantially closed and the choke valve 152 is opened. Therefore, the valve actuator 223 is energized to move the valve member 221b in the valve 221 leftward. Thus, the pressure chamber 205 in rear clutch 28 is opened to the drain line 211c. The clutch 28 is therefore released so that the engine vibrations are prevented from being transmitted through the transmission to the vehicle body. At this instance, since a certain pressure is maintained in the pressure chamber 205 by the valve 222, the clutch 28 can immediately be connected when it is desired to start the vehicle.

When the operator desires to make the vehicle run at a very slow speed utilizing the creep phenomenon, he may simply release the foot brake and the hand brake. This will turn the output a of the control circuit 224 to a low level to thereby de-energize the valve actuator 223. The valve member 221a is therefore shifted rightwards under the influence of the return spring 235 so that the hydraulic pressure is applied to the pressure chamber 205 to thereby engage the clutch 28.

When the vehicle is stopped with the select valve 103 in either of the P and N positions and with the first AND circuit 232 producing a high level signal i, a shifting movement of the select valve 103 to either of the D, 2 and 1 positions will turn the output a of the second AND circuit 233 to a high level. This high level signal a functions to energize the valve actuator 223 to thereby move the valve member 221b leftwards. Thus, the clutch 28 tends to be maintained at the disengaged position even though a hydraulic pressure is applied to the line segment 211b. It should however be noted that, at this instance, the low level signal from the inhibitor switch 230 is delayed by the circuit 234 so that the high level signal a from the second AND circuit 233 is delayed for a certain period of time. During this time delay period, a hydraulic pressure is applied to the pressure chamber 205 momentarily engaging the rear clutch 28. This will produce a clutch engaging shock which is felt by the operator to confirm that the shifting has unfailingly took place.

When the choke valve 152 is closed or in operation, the output of the AND circuit 232 is turned to low level so that the rear clutch 28 is kept in the engaged position as long as the select valve 103 is in either of the D, 2 and 1 positions. This feature is desirable from the viewpoint of safety since the engine speed is relatively high when the choke valve 152 is working. Without the above arrangement, there may be a danger that the vehicle dashes when the brake is released. Alternatively, the choke valve switch 229 may be substituted by an engine speed sensing switch which is turned on at an engine speed below a predetermined value. In the arrangement described above, the two-way valve 221 is provided only in the line 211 leading to the rear clutch 28, however, a similar arrangement can also be adopted in the line 107 leading to the front clutch 27.

It is preferable that the foot brake switch 227 be closed when the brake actuating foot pedal is depressed beyond a certain distance or the foot brake pressure is increased beyond a predetemined value. This feature will make it possible to make the vehicle move at a very slow speed with the brake lightly applied.

Other Embodiment

Figure 5:
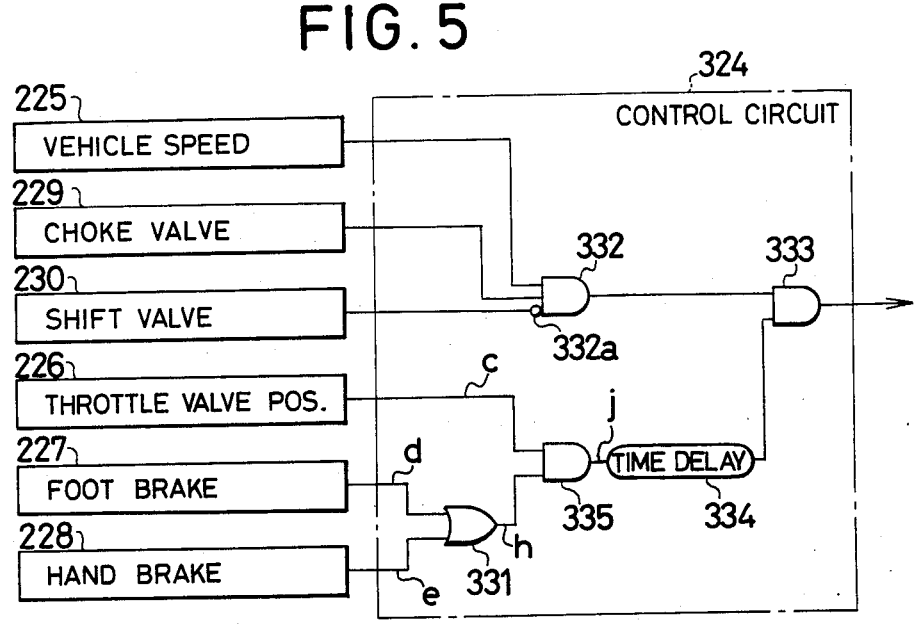
FIGS. 5 and 6 are circuit diagrams similar to FIG. 4 but showing other embodiments.

FIG. 5 shows another embodiment of the present invention. In this embodiment, there is provided a control circuit 324 which substitutes the circuit 224. The control circuit 324 includes an OR circuit 331 having input terminals connected with the foot brake switch 227 and the hand brake switch 228 to receive the signals d and e, and produces a high level signal h when either or both of the signals d and e are received. The output of the OR circuit 331 is connected to one input termunal of an AND circuit 335. Connected to the other input terminal of the AND circuit 335 is an engine throttle lever switch 226 to apply a throttle valve position signal c to the AND circuit 335 which then produces a high level signal j when both of the signals c and h are of high level.

There are also provided an AND circuit 332 which is applied directly with a vehicle speed signal b from the speed detector 225 and a choke valve signal f from the choke valve switch 229 and through an inverter 332a with a shift valve position signal g from the switch 230. The output of the AND circuit 332 is applied to one input terminal of an AND circuit 333. The output of the AND circuit 335 is applied through a time delay circuit 334 to the other input terminal of the AND circuit 333. This arrangement is effective to prevent frequent repetition of clutch engagement and disengagement when the engine controlling foot pedal and the brake control foot pedal are alternately and repeatedly actuated.

Figure 6:
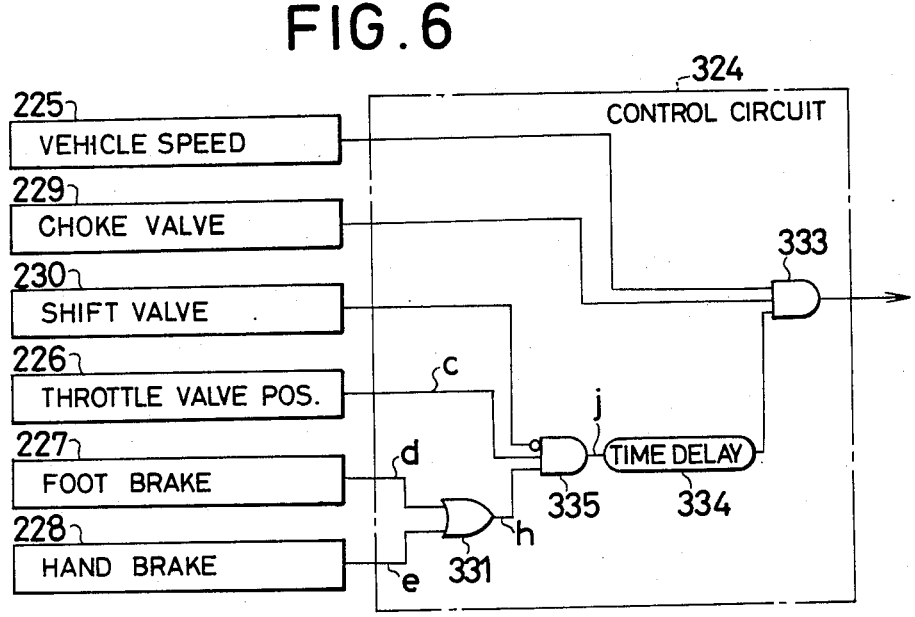

The embodiment shown in FIG. 6 is different from the embodiment shown in FIG. 5 in that the signal from the shift valve position switch 230 is passed through the time delay circuit 334.

The invention has thus been shown and described with reference to specific embodiments, however, it should be noted that the invention is in no way limited to the details of the illustrated arrangements but changes and modifications may be made without departing from the scope of the appended claims.

I claim:

1. A control system for vehicle automatic transmissions comprising hydraulic actuator means for engaging friction engaging means for establishing a driving gear train, hydraulic conduit means for supplying hydraulic pressure to said hydraulic actuator means, control valve means provided in said hydraulic conduit means to connect the actuator means alternately to hydraulic source means and drain conduit means, pressure reducing valve means provided in said drain conduit means for producing a pressure which is lower than a pressure for making the friction engaging means engage, vehicle speed detecting means for detecting vehicle speed and producing a low vehicle speed signal showing that the vehicle speed is below a predetermined value, position detecting means for detecting position of an engine power control member and producing a position signal when the control member is in a low engine output position smaller than a predetermined position, brake actuation means for producing a brake signal when vehicle brake means is in operation, range detecting means for detecting position of a manually operated shift lever and producing a running range signal when said shift lever is in a running range, valve actuating means for actuating said control valve means, control means for controlling operation of said valve actuating means, said control means being responsive to said low vehicle speed signal, said position signal, said brake signal, and said running range signal for producing a control signal to operate said valve actuating means for moving said control valve means so that the hydraulic actuator means is connected to the drain conduit means when all of said signals are received, said control means including time delay means for applying a time delay to said running range signal so that the control signal is produced after a predetermined delay time when the manual shift lever is moved to a running range.

2. A control system in accordance with claim 1 in which said control means includes time delay means for applying a time delay to said position signal and said brake signal so that the control signal is produced after a predetermined delay time when both of the position and brake signals are produced.

3. A control system in accordance with claim 1 in which said control means includes time delay means for applying a time delay to said range signal, said position signal and said brake signal so that the control signal is produced after a predetermined delay time when all of said range, position and brake signals are produced.

4. A control system in accordance with claim 1 which includes engine operating condition detecting means for detecting the engine operating condition through a member other than the engine power control member which affects the engine speed, said control means being responsive also to a signal from said member other than the engine power control member showing that the member is not in operation.

5. A control system in accordance with claim 4 in which said member other than the engine power control member is choke valve means.

6. A control system in accordance with claim 1 in which said brake actuation detecting means includes means for detecting actuation of at least one of foot brake means and hand brake means.

7. A control system in accordance with claim 1 in which said brake actuation detecting means includes means for producing said brake signal when brake actuating foot pedal means is depressed beyond a predetermined distance.

8. A control system in accordance with claim 1 in which said brake actuation detecting means includes means for producing said brake signal when brake pressure exceeds a predetermined level.

9. A control system in accordance with claim 1 in which said pressure reducing valve means includes one-way check valve means comprised of a ball and a spring.

10. A control system for vehicle automatic transmissions comprising first hydraulic actuator means for engaging forward driving friction engaging means for establishing a forward driving gear train, second hydraulic actuator means for engaging reverse driving friction engaging means for establishing a reverse driving gear train, first hydraulic conduit means for supplying hydraulic pressure to said first hydraulic actuator means, second hydraulic conduit means for supplying hydraulic pressure to said second hydraulic actuator means, control valve means provided in at least one of said hydraulic conduit means to connect the actuator means associated with said hydraulic conduit means alternately to hydraulic source means and drain conduit means, pressure reducing valve means provided in said drain conduit means for producing a pressure which is lower than a pressure for making the friction engaging means engage, vehicle speed detecting means for detecting vehicle speed and producing a low vehicle speed signal showing that the vehicle speed is below a predetermined value, position detecting means for detecting position of an engine power control member and producing a position signal when the control member is in a low engine output position smaller than a predetermined position, brake actuation detecting means for producing a brake signal when vehicle brake means is in operation, engine speed detecting means for detecting an engine operating condition and producing a low engine speed signal showing that the engine speed is lower than a predetermind value, range detecting means for detecting position of a manually operated shift lever and producing a running range signal when said shift lever is in a running range, valve actuating means for actuating said control valve means, control means for controlling operation of said valve actuating means, said control means being responsive to said low vehicle speed signal, said position signal, said brake signal, said low engine speed signal and said running range signal for producing a control signal to operate said valve actuating means for moving said control valve means so that the hydraulic actuator means is connected to the drain conduit means when all of said signals are received, said control means including time delay means for applying a time delay to said running range signal so that the control signal is produced after a predetermined delay time when the manual shift lever is moved to a running range.

11. A control system for vehicle automatic transmissions comprising first hydraulic actuator means for engaging forward driving clutch means for establishing a forward driving gear train, second hydraulic actuator means for engaging reverse driving clutch means for establishing a reverse driving gear train, first hydraulic conduit means for supplying hydraulic pressure to said first hydraulic actuator means, second hydraulic conduit means for supplying hydraulic pressure to said second hydraulic actuator means, control valve means provided in at least one of said hydraulic conduit means to connect the actuator means associated with said hydraulic conduit means alternately to hydraulic source means and drain conduit means, pressure reducing valve means provided in said drain conduit means for producing a pressure which is lower than a pressure for making the clutch means engage, vehicle speed detecting means for detecting vehicle speed and producing a low vehicle speed signal showing that the vehicle speed is below a predetermined value, position detecting means for detecting position of an engine power control member and producing a position signal when the control member is in a low engine output position smaller than a predetermined position, brake actuation detecting means for producing a brake signal when vehicle brake means is in operation, engine speed detecting means for detecting an engine operating condition and producing a low engine speed signal showing that the engine speed is lower than a predetermined value, range detecting means for detecting position of a manually operated shift lever and producing a running range signal when said shift lever is in a running range, valve actuating means for actuating said control valve means, control means for controlling operation of said valve actuating means, said control means being responsive to said low vehicle speed signal, said position signal, said brake signal, said low engine speed signal and said running range signal for producing a control signal to operate said valve actuating means for moving said control valve means so that the hydraulic actuator means is connected to the drain conduit means when all of said signals are received, said control means including time delay means for applying a time delay to said running range signal so that the control signal is produced after a predetermined time delay when the manual shfit lever is moved to a running range.

12. A control system in accordance with claim 10 in which said engine speed detecting means is choke valve means, said low engine speed signal being a signal showing that the choke valve means is not in operation.

13. A control system in accordance with claim 1 in which said control valve means, during the time delay applied to said running range signal by said time delay means, causes an indication that the manual shift lever has been moved to a running range.

14. A control system in accordance with claim 13 in which the indication caused by said control valve means is momentary energization of said hydraulic actuator means so as to cause momentary engagement of said friction engaging means.

15. A control system in accordance with claim 10 in which said control valve means, during the time delay applied to said running range signal by said time delay means, causes an indication that the manual shift lever has been moved to a running range.

16. A control system in accordance with claim 15 in which the indication caused by said control valve means is momentary energization of at least one of said hydraulic actuator means so as to cause momentary engagement of the associated one of said friction engaging means.

17. A control system in accordance with claim 11 in which said control valve means, during the time delay applied to said running range signal by said time delay means, causes an indication that the manual shift lever has been moved to a running range.

18. A control system in accordance with claim 17 in which the indication caused by said control valve means is momentary energization of at least one of said hydraulic actuator means so as to cause momentary engagement of the associated one of said clutch means.

* * * * *